Sept. 12, 1950     C. E. EARLE ET AL     2,521,701
COUPLING
Filed Dec. 27, 1946     2 Sheets-Sheet 1
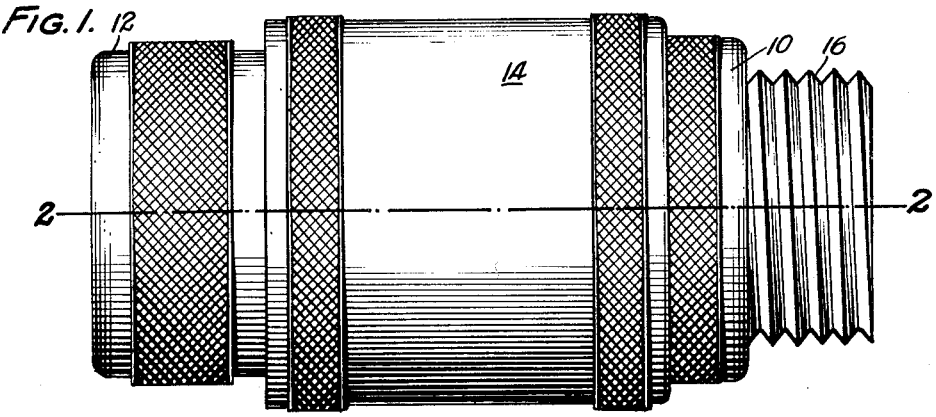
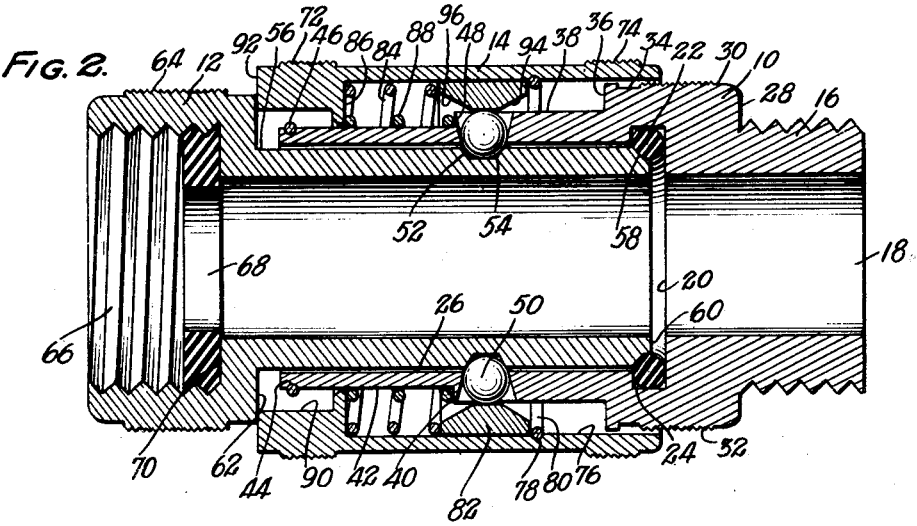
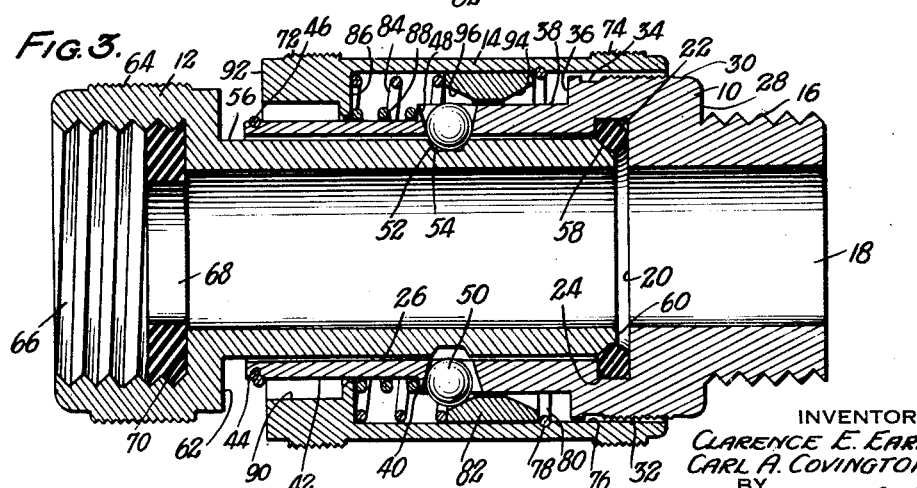
INVENTORS
CLARENCE E. EARLE AND
CARL A. COVINGTON,
BY
Raymond W. Colter
ATTORNEY Sept. 12, 1950     C. E. EARLE ET AL     2,521,701
COUPLING
Filed Dec. 27, 1946     2 Sheets-Sheet 2
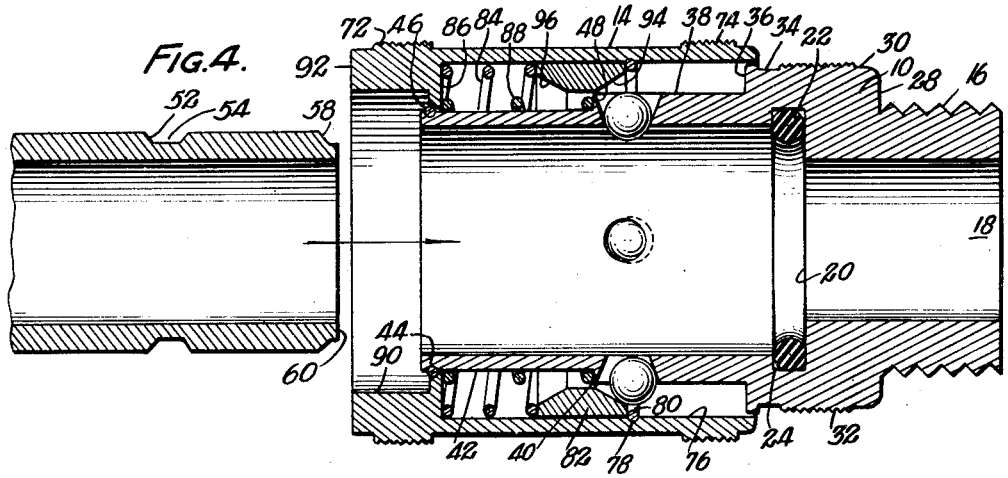
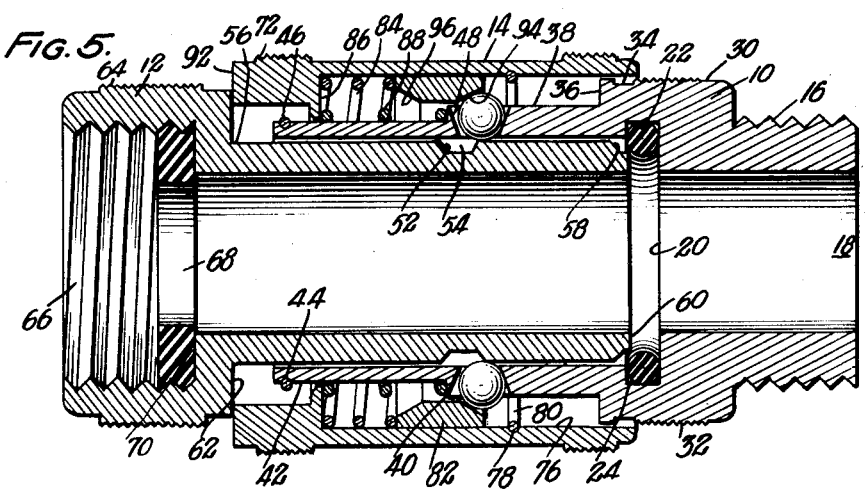
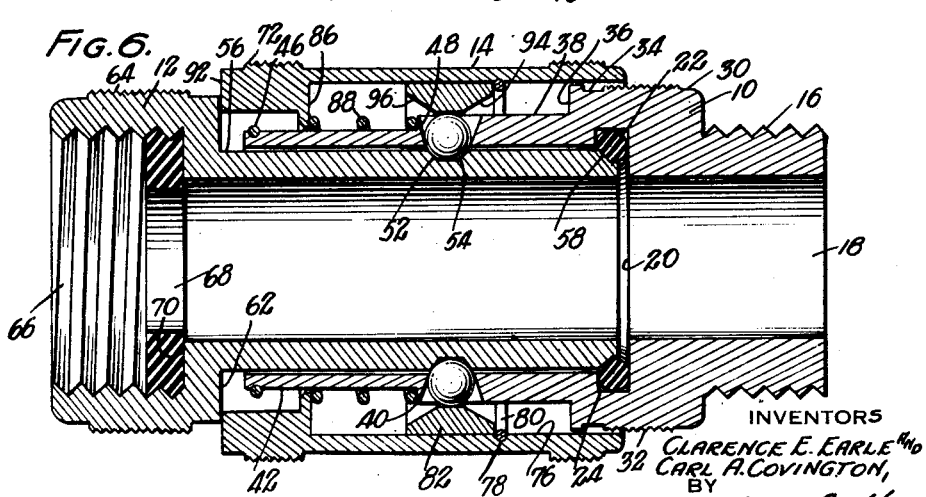
INVENTORS
CLARENCE E. EARLE AND
CARL A. COVINGTON,
BY
Raymond Whotter
ATTORNEY Patented Sept. 12, 1950

2,521,701

UNITED STATES PATENT OFFICE 2,521,701

COUPLING

Clarence E. Earle, Washington, D. C., and Carl A. Covington, Arlington County, Va.

Application December 27, 1946, Serial No. 718,662

8 Claims. (Cl. 285—169)

1

Despite the great number of patents extant on the subject, the demand for a simple, inexpensive and satisfactory, quickly attachable and detachable coupling has not been fulfilled prior to this time.

One of the more recent efforts in this behalf is represented by the disclosure of the patent to Scheiwer, 2,377,812, dated June 5, 1945. In accordance with the present invention, a coupling has been created which possesses all of the advantages of the Scheiwer coupling and the disadvantages thereof have been obviated. The present structure is less expensive to produce, simpler to operate and assemble, has fewer exposed working parts and is well adapted for one hand operation during both assembly and separation of the coupling members with respect to one another.

The invention contemplates a coupling comprising two joint members, a detent carried by one of the joint members in normally released condition and means moved in one direction upon assembly of the members to operate the detent and secure the members, further movement of the means in the same direction releasing the detent. The means which is moved upon assembly of the members to operate the detent may be biased in one direction, which direction may be opposed to that in which it is moved upon such assembly, the biasing being accomplished by resilient and/or magnetic means. The means so moved upon assembly of the members may assume the form of a cam whose shape may be generally annular and whose operating surfaces may be spaced one from the other, so that such a cam may assume the form of a cylindrical surface interposed between a pair of inclined surfaces. A sleeve carried by one of the members may be moved in one direction upon assembly of such members to operate the detent and secure the members and such sleeve may have a portion interposed in the path of the other member for engagement during a coupling operation. The sleeve may likewise be biased in a direction opposed to that in which it is moved as result of a coupling operation. When the coupling members are assembled, the sleeve will preferably assume an intermediate position, which may be one of three positions assumed in the course of a complete coupling and uncoupling operation.

The detent may assume the form of a plurality of balls carried by one of the joint members, and such joint member may contain radial perforations to receive such balls. The detent actuating means preferably assumes a position for releasing the detent during assembly of the joint members, such actuating means being shifted to a position confining the detent by assembly of the members and having a third position for releasing the detent. The joint members may assume the form of a plug and a socket, in which case, the detent may be carried by the socket and the plug may contain a recess to receive the detent. The means for confining the detent in response to assembly of the members may have an intermediate position with respect to one of the members while the parts are assembled, being movable in either direction from such position to release the detent. A sleeve carried by one of the joint members may be biased in one direction with respect thereto, the sleeve in turn receiving a cam biased in another direction with respect thereto, the other member carrying means for shifting the sleeve during assembly of the members, such shifting increasing the bias on the cam to produce a snap action upon the detent when it registers with a recess, further shifting of the sleeve in the same direction serving to release the detent. To release the coupled members, movement of the detent actuating means is preferably in a direction away from the member which receives the detent only during coupled conditions.

By virtue of the arrangement of parts proposed herein for the first time, the joint members can be coupled or uncoupled by the use of one hand and with much greater facility than in the case of other known couplings by the use of two hands.

A more complete understanding of the invention will follow from a detailed description of the accompanying drawings wherein:

Fig. 1 is an elevation showing the parts in assembled relationship;

Fig. 2 is a sectional elevation taken along line 2—2 of Fig. 1;

Fig. 3 is a sectional elevation similar to Fig. 2 wherein the external sleeve has been shifted to permit separation of the joint members;

Fig. 4 is a fragmentary sectional elevation indicating the relationship of parts prior to a coupling operation;

Fig. 5 is a sectional elevation similar to that of Fig. 2, showing the parts partially assembled in the positions they assume just prior to the actuation of the detent; and Fig. 6 is a sectional elevation similar to that of Fig. 2 wherein the detent actuating means relies upon magnetic bias to seek its operative detent confining position.

The coupling depicted in the drawings comprises a socket member 10, a plug member 12 and a sleeve 14 carried by the socket member and capable of being reciprocated thereon. These members are depicted as being knurled at convenient points to facilitate gripping by the operator.

The socket member 10 is shown as having an externally threaded end 16 surrounding a bore 18 extending to a shoulder 20 constituting an abutment for a toroidal resilient packing 22 seated in an internal groove 24. Beyond the internal groove 24, the socket member provides an enlarged internal bore 26 adapted to receive a cooperating portion of the plug member. The external threads 16 on the socket member terminate at a radial shoulder 28, beyond which a substantially cylindrical portion 30 extends, provided with knurling 32, the knurling terminating at an annular groove 34, the cylindrical portion terminating at a shoulder 36. Beyond the shoulder 36, the socket member is provided with a reduced periphery 38, which is further reduced at an intermediate shoulder 40 to define a periphery 42, interrupted only near its end by an annular arcuate groove 44 adapted to receive a split retainer ring 46. Adjacent the shoulder 40, radial frustro-conical openings 48 are provided through the larger periphery of the socket member to receive detent means in the form of a plurality of balls 50, four such balls having been indicated in the drawings, the relative dimensions of the openings as compared with the balls being such that the latter cannot pass entirely through the openings, but portions thereof can extend inwardly beyond the inner wall of the socket member for engagement with the inclined walls 52 of an annular recess 54 provided intermediate the ends of the substantially cylindrical periphery 56 of the plug.

The forward end of the plug periphery 56 is beveled to form a substantially frusto-conical sealing surface 58 which terminally intersects a nipple 60 for projection into the packing 22. The other end of the plug periphery 56 terminates at a radial shoulder 62, beyond which the plug is enlarged externally to receive knurling 64 and internally to receive threads 66 and a packing element 68 seated at the base of the threads against an internal shoulder 70.

The sleeve 14 is externally substantially cylindrical, provided with knurling 72 and 74 near its respective ends. One end of the sleeve is internally bored to a diameter sufficient to clear the adjacent cylindrical portion 30 of the socket member 18. At an intermediate portion, the internal bore 76 is grooved arcuately to define a recess 78 to receive an annular split retainer ring 80 which functions to limit movement in one direction of a cam 82 with respect to the sleeve. As depicted in Figs. 2 to 5 inclusive, this cam is biased toward the retainer ring 80 by means of a compression spring 84 which bears against a shoulder 86 at which the internal bore 76 is terminated. The shoulder 86 extends radially inwardly to a diameter slightly larger than that of the periphery 42 of the socket member, but slightly smaller than that of the retainer ring 46 when arranged in its groove near the end of the socket member. Also bearing against the shoulder 86 is an independently operating compression spring 88 whose other end bears against the shoulder 48 formed between the peripheries 38 and 42 of the socket member. Beyond the radial shoulder 36, the sleeve is provided with a counterbore 90 extending to the open end of the sleeve, terminated by an abutment 92 whose internal diameter is somewhat smaller than the external diameter of the cooperating shoulder 62 formed at the enlarged end of the plug.

Upon reference to Fig. 4 of the drawings, depicting the joint members prior to assembly, it will be evident that under the influence of the spring 88, the sleeve 14 is normally biased towards the left with respect to the socket member to a position which is limited by the retainer ring 46. It is also clear from this figure that by the action of the spring 84, the cam 82 is biased towards the right with respect to the sleeve 14 to a position which is limited by the retainer ring 80. With the parts thus related, it will be noted that the inclined operating surface 94 of the cam 82 permits sufficient radial movement of the balls to freely admit the end of the plug 12. The action of the spring 84 may be supplemented or replaced by utilizing magnetic principles. For example, the cam 82 and/or its retainer ring 78 may be permanently magnetized so that the cam will seek a position in contact with its retainer ring. Whereas it is contemplated that a spring or other resilient element may be used alone for this purpose or in combination with magnetic biasing, Fig. 6 of the drawings has been presented to illustrate the arrangement of parts where magnetic biasing alone is relied upon to serve this function.

With the parts in the positions depicted in Fig. 4 of the drawings, as the plug is advanced for introduction into the socket, the leading end of the plug will displace the balls 50 outwardly, since they are in released condition at this time, the shoulder 62 of the plug ultimately engaging the abutment 92 formed on the end of the sleeve 14, shifting the sleeve towards the right with respect to the socket member 16 and simultaneously compressing the spring 88 interposed between the shoulder of the socket member and its sleeve. Inasmuch as the balls have been projected outwardly by the end of the plug, the cam 82 will be restrained against movement with the sleeve and accordingly, its spring 84 will become further compressed so long as the positions of the balls produce an effective external diameter larger than that of the cylindrical portion of the cam intermediate the inclined operating surface 94 and the inclined operating surface 96. This condition has been depicted in Fig. 5 of the drawings, further movement of the plug towards the right bringing its recess 54 into registry with the balls, whereupon the camming action of the operating surface 94 of the cam under the influence of the spring 84 will drive the balls inwardly to seat in the recess 54 and simultaneously, the sealing surface at the leading edge of the plug will engage the packing 22 to effect a fluid tight seal. This assembled relationship of the parts is shown in Fig. 2 of the drawings.

When it is desired to uncouple the joint members, the sleeve 14 is shifted additionally towards the right to a position somewhat analogous to that depicted in Fig. 3 of the drawings, retracting the cam 82 from its confining position upon the balls while further compressing the spring 88 which governs the position of the sleeve with respect to the socket member. With the parts in the position depicted in Fig. 3, the plug 12 can be withdrawn, since the balls will ride up the inclined walls defining the recess 54 when the operating surface 96 of the cam has moved to the right of the balls as clearly shown in Fig. 3. Once the plug has been retracted from the socket by an amount sufficient to remove its recess 54 from registry with the balls, the latter will remain in their outer positions until the plug has been completely withdrawn. At this time, the cam will force the balls inwardly again as result of expansion of the spring 88 and the parts will return to the relative positions shown in Fig. 4 of the drawings.

Assuming that the socket member 18 is fastened to a wall bracket or even to a heavy hose line, the coupling operation can be effected by merely introducing the plug into the socket and advancing it until the balls are heard to snap into position. To uncouple the members, the sleeve is moved away from the plug, whereupon the thumb and forefinger of the operator engage the adjacent portion of the plug, following which movement of the plug and sleeve in the same direction will move the balls outwardly and the plug can then be readily retracted. Where the uncoupling operation is to be performed with the use of both hands, one will engage the plug and the other the sleeve, whereupon it is merely necessary to urge the two in opposite directions to remove the plug.

It will be noted that the parts of the socket member are entirely retained by the use of two split rings, representing a most simple and economical mode of assembly.

Whereas many modifications of the present invention will suggest themselves to those skilled in the art after becoming familiar with the present disclosure, and whereas such modifications are even now contemplated, it is believed that the examples depicted and described will suffice for illustration of the invention, the scope of which is not to be limited however, beyond that of the appended claims.

We claim:

1. A coupling comprising two joint members, a detent movably carried by one of said members for securing it to the other, said detent being in released condition prior to assembly of said members, detent operating means movably carried by one of said members for engagement with and in the path of the other and movable in one direction upon assembly of said members to operate said detent to its securing position, and said detent operating means being manually shiftable for imparting further movement to said detent operating means in the same direction to a detent releasing position.

2. A coupling comprising two joint members, a detent movably carried by one of said members for securing it to the other, said detent being in normally released condition, detent operating means movably carried by one of said members magnetically biased in one direction to shift said detent to its securing position and movable in another direction upon assembly of said members, and manually engageable means for imparting further movement to said detent operating means in the said one direction to a detent releasing position.

3. A coupling comprising two joint members, a detent movably carried by one of said members for securing it to the other, said detent being in released condition prior to assembly of said members, a detent operating cam movably carried by one of said members, a cam actuator carried by one of said members for engagement with and in the path of the other imparting movement to said cam in one direction upon assembly of said members to operate said detent to its securing position, and said detent operating means being manually shiftable for imparting further movement to said cam in the same direction to a detent releasing position.

4. A coupling comprising two joint members, detent balls movably carried by one of said members for securing it to the other, said balls being in normally released condition, ball operating means movably carried by one of said members in the path of the other and movable in one direction upon assembly of said members to confine said balls to their securing positions, and manually engageable means for imparting further movement to said ball operating means in the same direction to a ball releasing position.

5. A coupling comprising two joint members, one of said members containing radial perforations, detent elements received in said perforations for securing said members in coupled relationship, said elements being in released condition, prior to assembly of said members, detent operating means movably carried by one of said members for engagement with and in the path of the other and movable in one direction upon assembly of said members to operate said elements to their securing positions, and said detent operating means being manually shiftable for imparting further movement to said detent operating means in the same direction to an element releasing position.

6. A coupling comprising two joint members, a detent movably carried by one of said members for securing it to the other, detent operating means movably carried by one of said members having a position for releasing said detent during assembly of said members, means carried by one of said members interposed in the path traversed by the other during assembly of said members to shift said operating means to a detent securing position during assembly of said members, and manually engageable means for imparting to said detent operating means a third position for releasing said detent.

7. A coupling comprising plug and socket members, a detent movably carried by said socket member for securing it to said plug, said detent being in released condition prior to assembly of said members, said plug containing a detent receiving recess, detent operating means movably carried by said socket member for engagement with and in the path of said plug and movable in one direction upon assembly of said members to position said detent in said recess, and said detent operating means being manually shiftable for imparting further movement thereto in the same direction to a detent releasing position.

8. A coupling comprising two joint members, a detent carried by one of said members in normally released condition, the other of said members containing a recess to receive said detent, a sleeve carried by said one member biased in one direction with respect thereto, a cam carried by said sleeve biased in another direction with respect thereto, means carried by said other member for shifting said sleeve during assembly of said members, such shifting of said sleeve increasing the bias on said cam to produce a snap action upon said detent when it registers with said recess, further shifting of said sleeve in the same direction releasing said detent.

CLARENCE E. EARLE.
CARL A. COVINGTON.

REFERENCES CITED

The following references are of record in the file of this patent:

UNITED STATES PATENTS

| Number | Name | Date |
|---|---|---|
| 1,468,732 | Bradbury | Sept. 25, 1923 |
| 2,377,812 | Scheiwer | June 5, 1945 |